United States Patent [19]
Okuno

[11] Patent Number: 5,123,771
[45] Date of Patent: Jun. 23, 1992

[54] COUPLING FIXTURE

[76] Inventor: Toshikazu Okuno, 5-10, 1-Chome, Chihara-cho,Izumiohtsu-shi,Osaka, Japan

[21] Appl. No.: 698,499

[22] Filed: Apr. 22, 1991

[30] Foreign Application Priority Data

Jun. 28, 1990 [JP] Japan ............... 2-68996[U]

[51] Int. Cl.⁵ ............................................. F16B 2/02
[52] U.S. Cl. ..................................... 403/369; 403/370; 403/371
[58] Field of Search ................... 403/371, 370, 369, 16

[56] References Cited

U.S. PATENT DOCUMENTS

| | | | |
|---|---|---|---|
| 3,009,747 | 11/1961 | Pitzer | 403/371 X |
| 3,720,429 | 3/1973 | Friedrichs et al. | 403/371 X |
| 3,990,804 | 11/1976 | Peter et al. | 403/370 |
| 4,475,842 | 10/1984 | Onaya et al. | 403/371 X |

FOREIGN PATENT DOCUMENTS

| | | | |
|---|---|---|---|
| 1194652 | 6/1965 | Fed. Rep. of Germany | 403/370 |
| 2142453 | 3/1973 | Fed. Rep. of Germany | 403/370 |
| 3716138 | 11/1988 | Fed. Rep. of Germany | 403/370 |
| 2207488 | 2/1989 | United Kingdom | 403/370 |

Primary Examiner—Randolph A. Reese
Assistant Examiner—Heather Chun
Attorney, Agent, or Firm—Stevens, Davis, Miller & Mosher

[57] ABSTRACT

A coupling fixture provided with an outer ring having first and second tapered surfaces, an inner ring having third and fourth tapered surfaces, a wedge-like ring nut interposed between the outer and inner rings and axially inwardly thereof and having tapered surfaces engageable with the first and third tapered surfaces. A wedge-like ring washer is interposed between the second and fourth tapered surfaces and axially outwardly thereof and having tapered surfaces engageable with the second and fourth tapered surfaces. Screw bolts are screwable into the ring nut to expand the outer ring in diameter and contract the inner ring in diameter, each cone angle of the tapered surfaces of the washer and of the tapered surfaces engageable therewith is made larger than that of the cone angle of the tapered surfaces of the ring nut and the first and third tapered surfaces engageable therewith and makes the washer more readily removable from the outer and inner rings when the screw bolts are loosened after being tightened.

2 Claims, 4 Drawing Sheets

COUPLING FIXTURE

FIELD OF THE INVENTION

The present invention relates to a coupling fixture for fixing a coupled member, such as a gear, mainly to a shaft member.

BACKGROUND OF THE INVENTION

Conventionally, this kind of coupling fixture, as shown in FIGS. 7 and 8, is provided with a cylindrical outer ring A and a cylindrical inner ring B each having a cut, the outer ring A being provided at both axial sides of the inner periphery thereof with tapered surfaces T1 and T2, the inner ring B being provided at both axial sides of the outer periphery thereof with tapered surface T3 and T4 opposite to the tapered surfaces T1 and T2 respectively, between the outer ring A and the inner ring B and at one axial side is interposed an annular ring nut C circumferentially continuing and having at the outer and inner peripheries thereof tapered surfaces T5 abutting against the tapered surfaces T1 and T3 respectively, between the rings A and B and at the other axial side is interposed an annular ring washer D circumferentially continuing and having at the inner and outer peripheries thereof surfaces T6 abutting against the tapered surfaces T2 and T4 respectively.

The ring washer D has at a plurality of circumferential portions axially through bores a and the ring nut C is provided at a plurality of portions opposite to the through bores a with a plurality of threaded bores b, first screw bolts E1 for tightening are inserted into the through bores a and threaded bores b respectively, a plurality of threaded bores c are formed at the portions on the ring washer D not opposite to the threaded bores b so as to insert second screw bolts E2 into the bores c respectively. Also, the tapered surfaces T1 through T6 provided at the outer ring a, inner ring B, ring nut C, and ring washer D each are set at a cone angle of about 7° through 15° in order to get a large wedgewise coupling force, in other words, to increase a press-containing force, with a small tightening force when the first screw bolts E1 tighten the ring nut C and ring washer D.

In a case where the above-mentioned coupling fixture is used to couple a gear G onto a shaft F, as shown in FIG. 7, the outer ring A and inner ring B are interposed between the inner periphery of a recess g provided at the gear G and the outer periphery of the shaft F, the first screw bolts E1 are screwably tightened to move the ring nut C and ring washer D close to each other, and the tapered surfaces T5 and T6 urge the tapered surfaces T1 and T3, and T2 and T4, so that the outer ring A is expanded in diameter to be brought into press-contact with the inner periphery of recess g and the inner ring B is contracted in diameter to be brought into press-contact with the outer periphery of shaft F, thereby integrally coupling the gear G with the shaft F.

The outer and inner tapered surfaces T5 of the ring nut C are rigidly coupled in wedge connection with the tapered surfaces T1 and T3 at the outer and inner rings A and B and the inner and outer tapered surfaces T6 of the ring washer D are coupled with the tapered surfaces T2 and T4 at the outer and inner rings A and B in the same manner as the above, so that the gear G is rigidly coupled with the shaft F, but when the gear G is dismantled therefrom, the rigid wedge connection should be released. Therefore, at first, the first screw bolts E1 are unscrewed and then, as shown in FIG. 8, the second screw bolts E2 are screwably inserted into the threaded bores c respectively and abut at the tips against the end face of ring nut C, the screw operation is repeated several times to thereby outwardly dismantle, by means of screw thrust, the washer D from the tapered surfaces T2 and T4 at the outer and inner rings A and B. After the ring washer D is dismantled, the previously unscrewed first screw bolts E1 are again screwed into threaded bores b and then hit on the heads to outwardly remove the ring nut C from the tapered surfaces T1 and T3, thereby eliminating the urging forces of the outer and inner rings A and B with respect to the gear G and shaft F so as to dismantle the gear G therefrom.

At such a coupling fixture, when the shaft F and gear G are tightly coupled as the above-mentioned, and thereafter dismantled from each other, in order to dismantle the rigidly coupled ring washer D from the outer and inner rings A and B, a problem is created in that the second screw bolts E2 are specially required and a complicated removal work is required as the above-mentioned.

SUMMARY OF THE INVENTION

In the light of the above problem, the present invention has been designed. An object thereof is to provide a coupling fixture which, when a shaft and a gear are rigidly coupled with an outer ring and an inner ring and thereafter dismantled, particular screw bolts are not required in order to remove a ring washer, so that the washer is easy to remove and the dismantling can simply be carried out.

In order to attain the above object, the coupling fixture of the invention used for fixing a coupled member mainly to a shaft member is provided with:

a) an outer ring having an outer periphery and an inner periphery provided with first and second tapered surfaces, and provided with a generally radially extending cut;

b) an inner ring having an outer periphery and an inner periphery provided with third and fourth tapered surfaces, and provided with a generally radially extending cut;

c) a wedge-like ring nut which is interposed between the inner periphery of the outer ring and the outer periphery of the inner ring, has tapered surfaces abutting against the first and third tapered surfaces respectively, and has a plurality of threaded bores circumferentially former therein;

d) a wedge-like washer which is interposed between the inner periphery of the outer ring and the outer periphery of the inner ring, has tapered surfaces abutting against the second and fourth tapered surfaces, circumferentially has through-bores opposite to the threaded bores respectively, and e) screw bolts inserted through the through-bores of the ring washer, screwing into the threaded bores of the ring nut to allow the ring washer and ring nut to enter between the inner periphery of outer ring and the outer periphery of inner ring, the outer ring being expanded in diameter and the inner ring being contracted in diameter, and is characterized in that f) the second and fourth tapered surfaces and the tapered surfaces at the ring washer each are larger in cone angle than the first and third tapered surfaces of the ring nut, so that when the screw bolts are loosened, the cone angle is set to allow the ring washer to move readily away from the outer and inner rings.

Also, it is preferable that in the present invention, the respective cone angles at the second and fourth tapered surfaces and the tapered surfaces at the ring washer are 20° or more, preferably about 40° through 45°, and those of the first and third tapered surfaces and the tapered surfaces of the ring nut, 7° to 16°.

The above-mentioned construction has the following effect:

The screw bolts are screwably tightened so that the outer ring is expanded in diameter through the ring nut and ring washer and also the inner ring is contracted in diameter through the same. Hence, a coupled member, such as a gear, can be coupled with the shaft member by means of a wedge effect. In a case where the gear and shaft are dismantled from each other, since the cone angles at the second and fourth tapered surfaces and the tapered surfaces of the washer each are larger than those at the first and third tapered surface and the tapered surfaces of the ring nut and have an angle to enable the ring washer to be readily removed from the outer and inner rings when the screw bolts are loosened after being screwably tightened, the screw bolts are unscrewed to be removed from the outer and inner rings by the screw thrust of screw bolt directly or by being subjected to a slight impact. Accordingly after the washer is removed, the ring nut can easily be removed by hitting the head of each screw bolt. Hence, there is no need to use special screw bolts as in the prior art, resulting in the fact that the washer is easy to dismantle from the shaft member. The above and further objects and novel features of the invention will more fully appear from the following detailed description when the same is read in connection with the accompanying drawings.

DETAILED DESCRIPTION OF THE DRAWINGS

Figure 1:
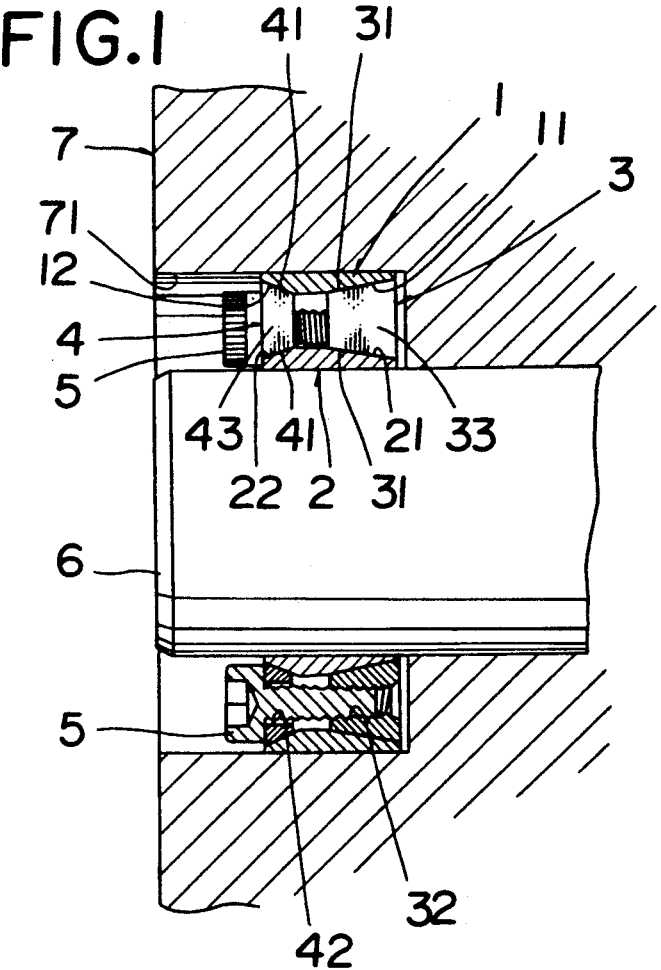
FIG. 1 is a longitudinally sectional view of a coupling fixture of the invention.
Figure 2:
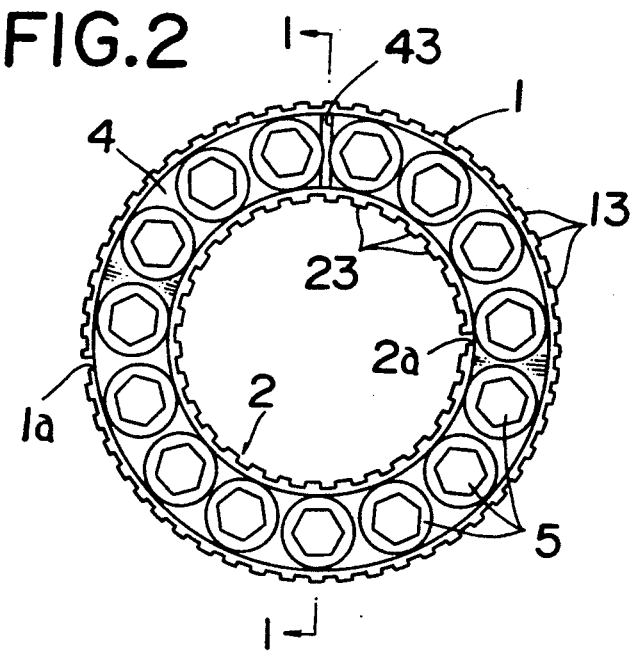
FIG. 2 is a front view thereof.
Figure 3:
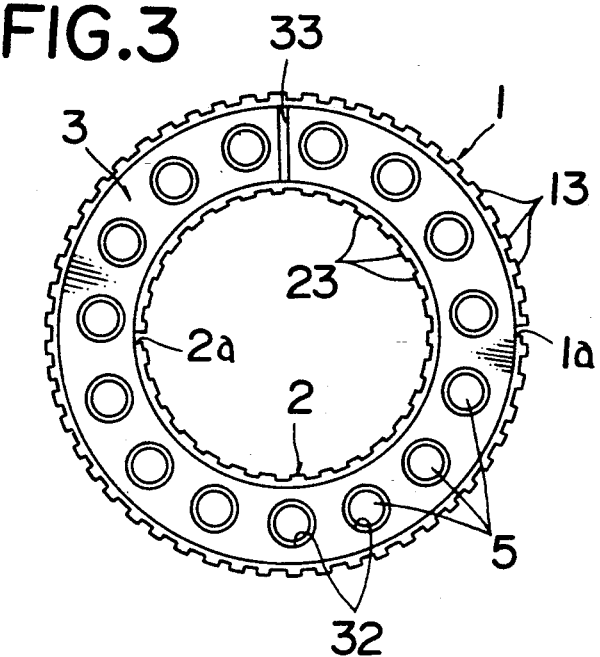
FIG. 3 is a rear view of the same.
Figure 4:
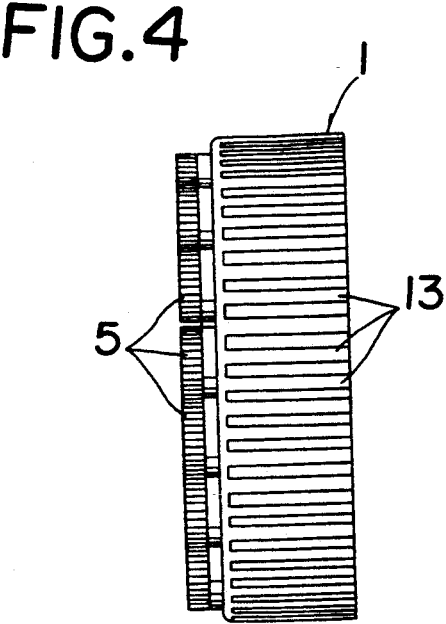
FIG. 4 is a side view of the same.
Figure 5:
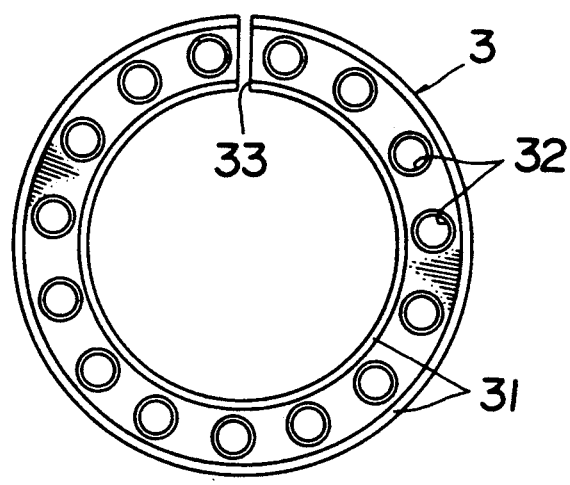
FIG. 5 is a front view of a ring nut.
Figure 6:
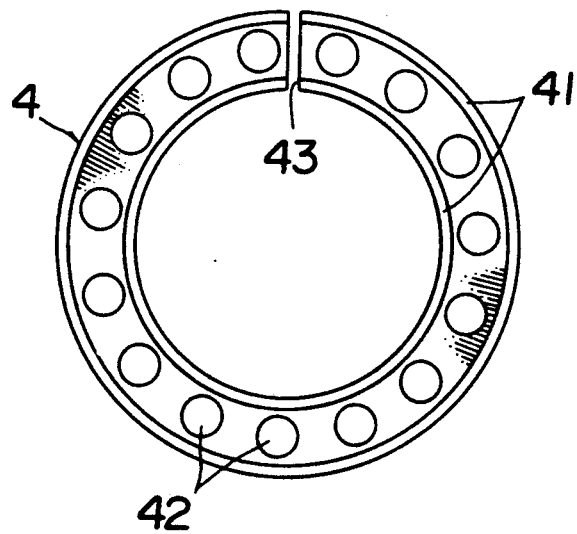
FIG. 6 is a front view of a ring washer.
Figure 7:
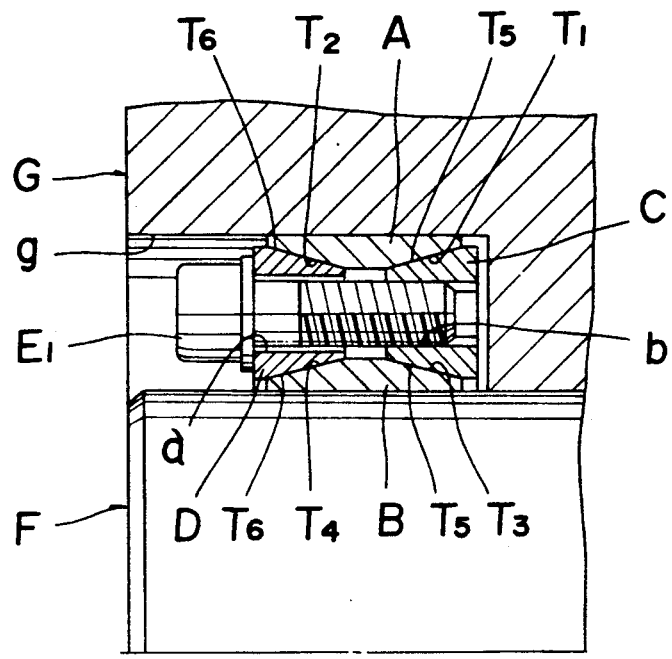
FIGS. 7 and 8 are sectional views of a prior art coupling fixture conventional example.
Figure 8:
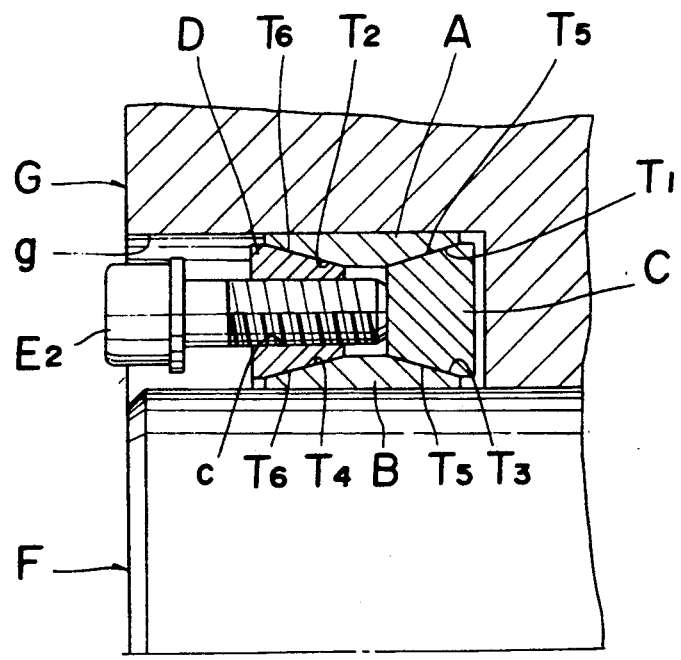

An embodiment of a coupling fixture shown in FIGS. 1 through 4 is provided with a cylindrical outer ring 1 of a generally C-like shape in section and having a cut 1a at a circumferential portion and a cylindrical inner ring 2 of a generally C-like shape in section similarly having a cut 2a, at the inner periphery of the outer ring 1. At the axially right side in FIG. 1 is formed a first tapered surface 11 increasing in inner diameter toward the right-side open end and at the axially left side in FIG. 1 is formed a second tapered surface 12 becoming larger in inner diameter toward the left-side open end. At the outer periphery of inner ring 2 and at the axially right side is formed a third tapered surface 21 opposite to the first tapered surface 11 of the outer ring 1 and becoming larger in outer diameter toward the right-side open end, and at the axially left side is formed a fourth tapered surface 22 opposite to the second tapered surface 12 at the outer ring 1 and becoming larger in outer diameter toward the left-side open end.

An annular ring nut 3 having at the outer and inner peripheries tapered surfaces 31 opposite to the first and third tapered surfaces 11 and 12 respectively, is interposed between the outer ring 1 and the inner ring 2 and at the axially right side, a plurality of threaded bores 32 are formed circumferentially of the ring nut 3, an annular ring washer 4 having at the outer and inner peripheries tapered surfaces 41 abutting against the second and fourth tapered surfaces 12 and 22 respectively is interposed between the outer ring 1 and the inner ring 2 and at the axially left side, a plurality of through bores 42 opposite to the threaded bores 32 respectively are provided circumferentially spaced around the ring washer 4, and screw bolts for tightening are provided which pass through the through bores 42 and are inserted into the threaded bores 32 to screw into the threaded bores 32 so as to move the ring nut 3 and ring washer 4 close to each other.

In the coupling fixture, as seen from FIG. 1, each cone angle of the first and third tapered surfaces 11 and 21 provided at the right sides of outer and inner rings 1 and 2 and of the tapered surfaces 31 at the ring nut 3 abutting against the first and second tapered surfaces 11 and 21 is formed to be about 7° to 16° through which a large press-contact force is obtained by a relatively small tightening force of the screw bolts 5 when screwably tightened. Also, that of the second and fourth tapered surfaces 12 and 22 provided at the axially left sides of outer and inner rings 1 and 2 and of the tapered surfaces at the ring washer 4 abutting against the tapered surfaces 12 and 22 is formed to be an angle of 20° or more, preferably about 40° to 45°, at which a jam or sticking of the screw bolt 5 when tightened is unlikely to occur and removal thereof is easy when loosened.

The above-mentioned coupling fixture, as shown in FIG. 1, is used for coupling, for example, a gear 7 to a shaft 6, in which outer ring 1 and inner ring 2 are interposed between the inner periphery of a recess 71 provided at the central portion at one axial side of gear 7 and the outer periphery of shaft 6 so as to screwably tighten the screw bolts 5, whereby the ring nut 3 and ring washer 4 move close to each other. Hence, the tapered surfaces 31 and 41 bias the tapered surfaces 11 and 21 and those 12 and 22 at the outer and inner rings 1 and 2 respectively, whereby the outer ring 1 is expanded in diameter to be brought into press-contact with the inner periphery of recess 71, the inner ring 2 being contracted in diameter to be brought into press-contact with the outer periphery of shaft 6. As a result, the wedge effect of the respective tapered surfaces rigidly couples the gear 7 onto the shaft 6. In this case, the cone angle of about 40° to 45° of the respective second and fourth tapered surfaces 12 and 22 at the outer and inner rings 1 and 2 and those 41 at the ring washer 4 can apply an urging force toward the outer and inner rings 1 and 2 without generating a jam of the screw bolt when screwably tightened. The cone angle of about 7° to 16° of the first and third tapered surfaces 11 and 12 at both the outer and inner rings 1 and 2 and those 31 of the ring nut 3 can easily and quickly screw the screw bolts 5 and apply a large press-contact force to between the respective tapered surfaces, thereby applying a radial urging force to the outer and inner rings 1 and 2 to result in exact and rigid coupling of the gear 7 with the shaft 6. When the gear 7 is dismantled from the shaft 6 coupled therewith, the cone angle of the respective tapered surfaces 12, 22 and 41 is 40° to 45°, wherein when the screw bolts 5 are unscrewed, the ring washer 4 can readily be removed at the tapered surfaces 41 thereof outwardly from the second and fourth tapered surfaces 12 and 22 directly or by axially hammering the heads of screw bolts 5. Thereafter, the screw bolts 5 are further hammered at the heads thereof to outwardly remove the tapered surfaces 31 of ring nut 3 from the first and third tapered surfaces 11 and 21 of outer and inner rings 1 and 2. As the result, the urging force of the outer and inner rings 1 and 2 with respect to the gear 7 and shaft 6 is released, thereby enabling the gear 7 to be dismantled from the shaft 6 with little work.

At the ring nut 3 and ring washer 4, as shown in FIGS. 1 through 3, 5 and 6, are formed cuts 33 and 43 by radially cutting the circumferential portions of the same so as to radially shift the ring nut 3 and ring washer 4 respectively.

In a case where the above-mentioned coupling fixture is used to couple the gear 7 with the shaft 6, when there is an error in the machining process, for example, the inner periphery of the recess 71 at the gear 7 is normal and a diameter of shaft 6 is smaller than a predetermined value, the ring nut 3 and ring washer 4 are close to each other as the screw bolts 5 are screwably tightened, whereby at first the outer ring 1 is expanded in diameter to be brought into press-contact with the inner periphery of recess 71, and thereafter, the screw bolts 5 are further continuously screwably tightened so that ring nut 3 and ring washer 4 having the cuts 33 and 43 apply an urging force to the inner ring 2 while being radially inwardly shifted so as to contact the inner ring 2 in diameter. Hence, the inner ring 2 is brought into press-contact with the outer periphery of shaft 6. Accordingly, the gear 7 and shaft 6 are stably and rigidly coupled with each other without generating a difference in the press-contacting force between the outer and inner rings 1 and 2. In addition, in the embodiment shown in the drawings, at the outer periphery of outer ring 1 and the inner periphery of inner ring 2 are formed splines 13 and 23 respectively.

In the above-mentioned embodiment, although it is described that the coupling fixture fixes the gear 7 to the shaft 6, the present invention of course is applicable to a case involving not only a gear but also a rotary disc or a cam member to be coupled with the shaft.

As seen from the above, the coupling fixture of the present invention enlarges the cone angle of the ring washer 4 interposed between the outer and inner rings 1 and 2 having the cuts respectively than that of the ring nut 3 and also forms a cone angle to be removable when the screw bolts 5 are loosened after being tightened. Therefore, when the coupled member, such as a gear is coupled with the shaft member and thereafter dismantled therefrom, the screw bolts are merely loosened without using the special screw bolts exclusive for dismantling, so that the ring washer 4 is easy to remove.

Accordingly, the coupled member can easily be dismantled by a simple effort.

While an embodiment of the invention has been shown and described, the invention is not limited to the specific construction thereof, which is merely exemplary in the specification rather than is defined.

What is claimed is:

1. A coupling fixture for fixing a coupled member mainly to a shaft member, said fixture comprising:
    a) an outer ring having an inner periphery and an outer periphery, provided at the inner periphery with a first tapered surface and a second tapered surface, and having a generally radially extending cut;
    b) an inner ring having an inner periphery and an outer periphery, provided at the outer periphery with a third tapered surface and a fourth tapered surface, and having a generally radially extending cut;
    c) a wedge-like ring nut interposed between the inner periphery of said outer ring and the outer periphery of said inner ring, having tapered surfaces abutting against said first and third tapered surfaces, and having a plurality of circumferentially spaced threaded bores,
    d) a wedge-like ring washer interposed between the inner periphery of said outer ring and the outer periphery of said inner ring, having tapered surfaces abutting against said second and fourth tapered surfaces, and having a plurality of circumferentially spaced through-bores axially aligned with said threaded bores respectively; and
    e) screw bolts which are insertably fitted through said through-bores and screwed into said threaded bores of said ring nut, so as to allow said ring washer and ring nut to enter between the inner periphery of said outer ring and the outer periphery of said inner ring, whereby said outer ring is expanded in diameter and said inner ring is contracted in diameter, said coupling fixture being characterized in that each cone angle of said second and fourth tapered surface and said tapered surface of said ring washer is larger than each cone angle of said first and third tapered surfaces and said tapered surfaces of said ring nut the arrangement being such as to allow said ring washer to be removable from said outer and inner rings when said screw bolts are loosened after being tightened.

2. A coupling fixture according to claim 1, wherein each cone angle of said second and fourth tapered surface and the corresponding tapered surfaces of said ring washer is 20° or more and each cone angle of said first and third tapered surfaces and the corresponding tapered surfaces of said ring nut is 7° through 16°.

* * * * *